UNITED STATES PATENT OFFICE.

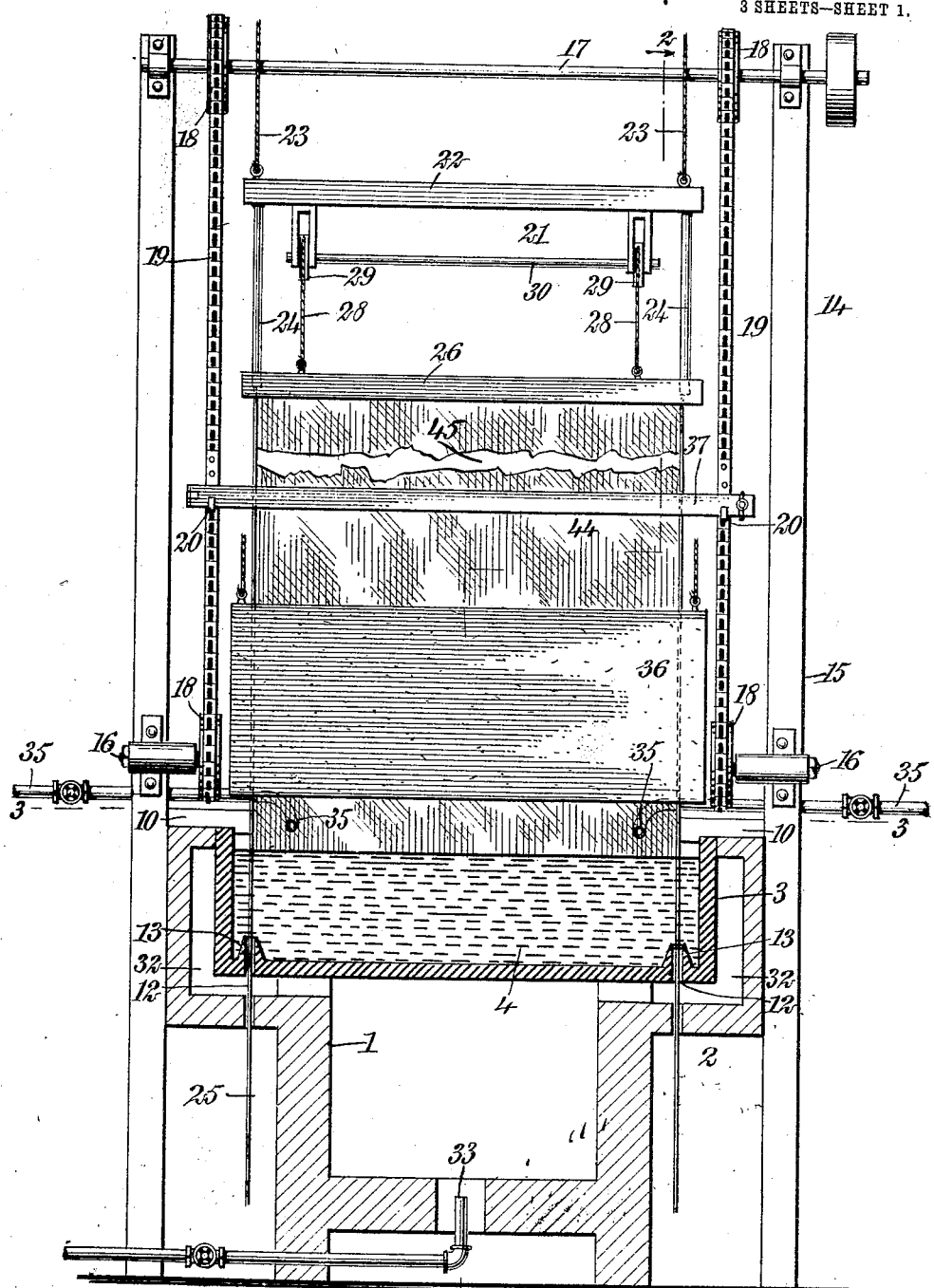

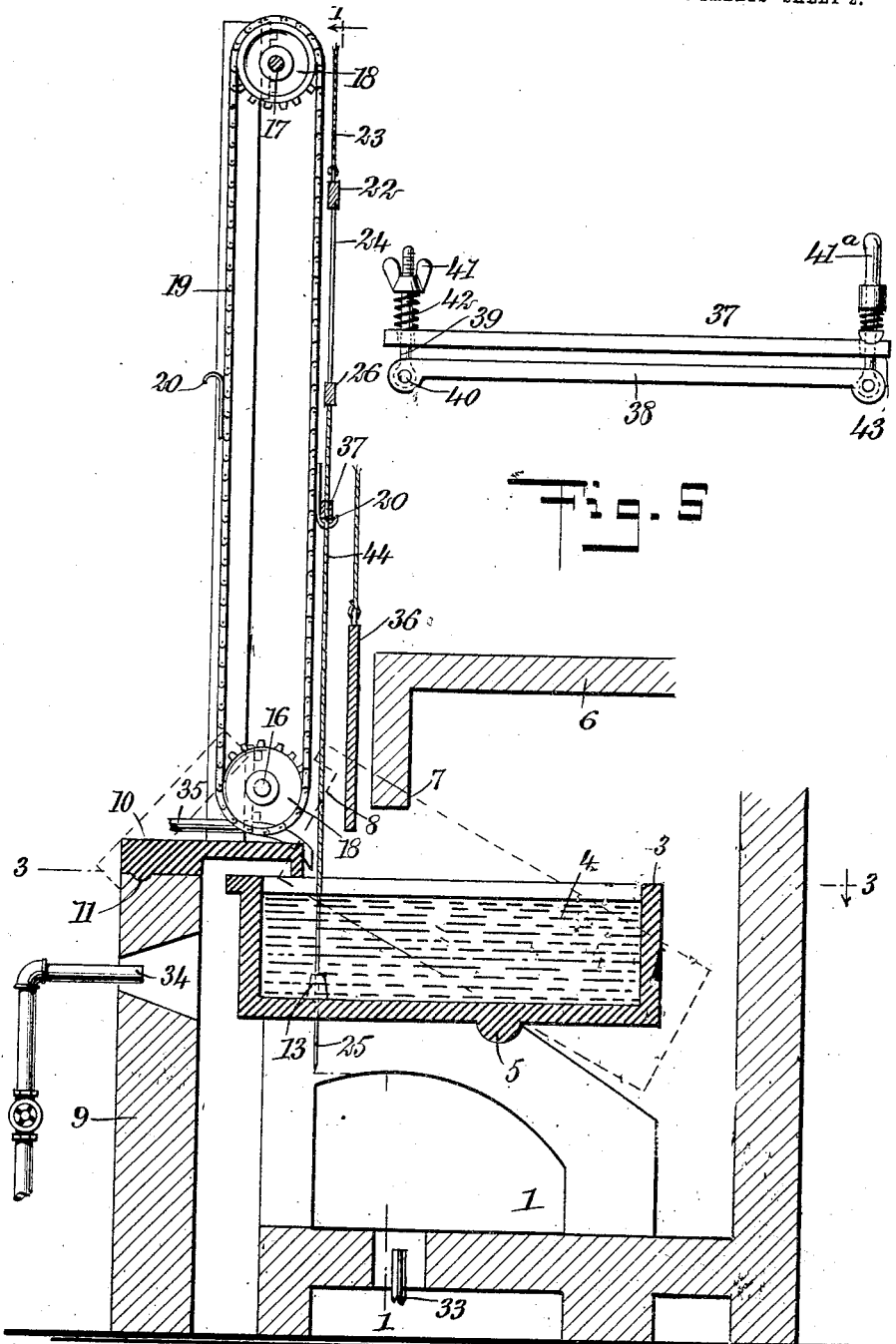

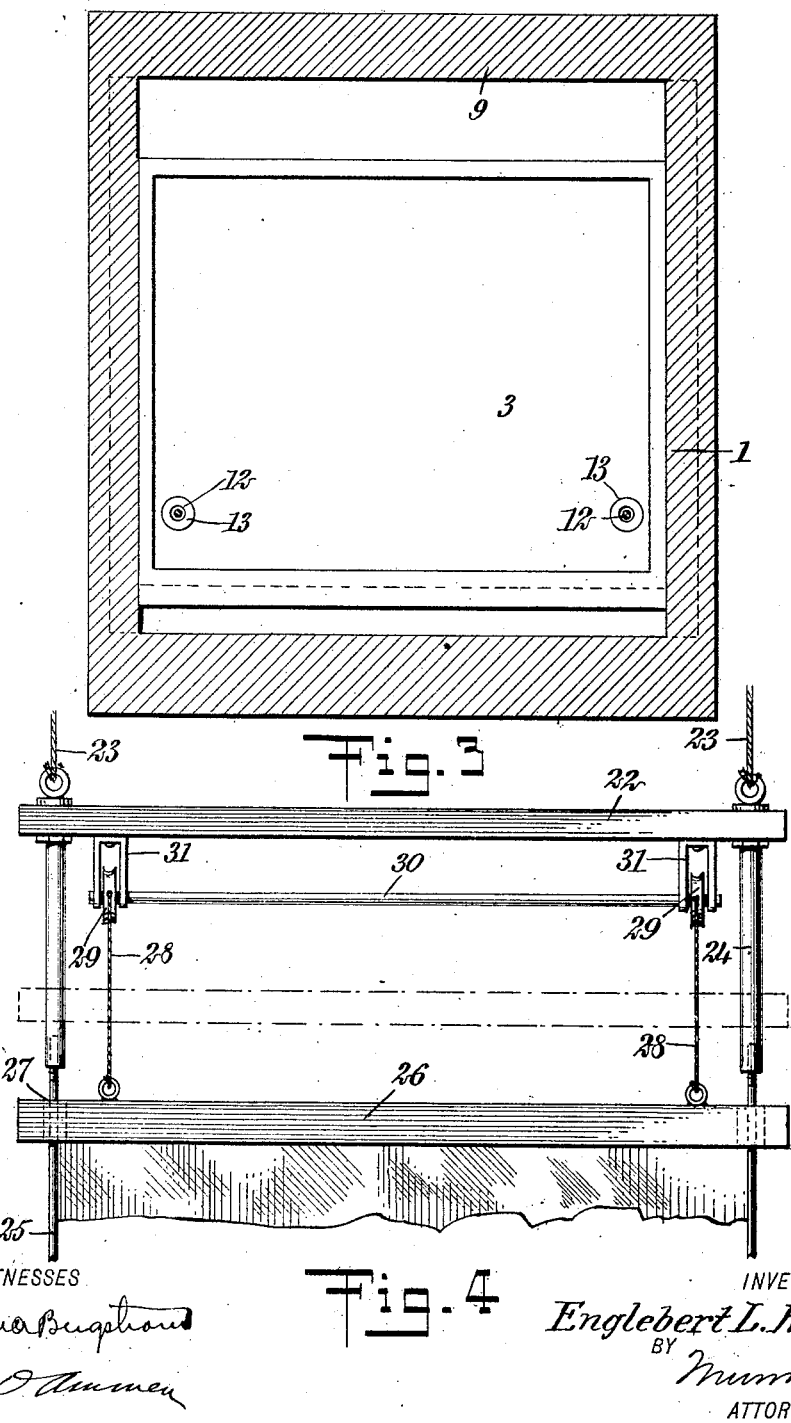

ENGLEBERT LUDVIK HEINTZ, OF COFFEYVILLE, KANSAS.

GLASS MACHINE AND PROCESS.

No. 908,259.   Specification of Letters Patent.   Patented Dec. 29, 1908.

Application filed February 18, 1907. Serial No. 357,366.

*To all whom it may concern:*

Be it known that I, ENGLEBERT LUDVIK HEINTZ, a citizen of the United States, and a resident of Coffeyville, in the county of Montgomery and State of Kansas, have invented a new and Improved Glass Machine and Process, of which the following is a full, clear, and exact description.

This invention relates to the art of glass making, and concerns itself with a process and with a machine or apparatus for carrying out said process.

The object of the invention is to produce a process and apparatus by means of which a glass sheet may be drawn from a mass of molten glass in such a way that the smoothness and uniformity of the sheet of glass will be preserved throughout its entire area.

More specifically, the object of the invention is to provide an arrangement for preventing the recession which tends to take place at the side edges of a sheet of glass when drawn from a bath of molten glass in the manner suggested. This recession of the side edges tends to wrinkle the sheet of glass and destroy its uniformity.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a vertical transverse section through a glass furnace, and illustrating the apparatus by means of which my process is carried out; this section is taken on the line 1—1 of Fig. 2 and looking in the direction of the arrows; Fig. 2 is a vertical section taken in a plane at right angles to Fig. 1; this view is taken on the line 2—2 of Fig. 1 and looking toward the right, as indicated by the arrows; Fig. 3 is a horizontal cross section on the line 3—3 of Fig 2; Fig. 4 is a front elevation of the baiting frame by means of which the sheet of glass is drawn from the crucible; and Fig. 5 is a plan of a clamp which I use for supporting the upper end of the glass sheet as it is drawn.

Referring more particularly to the parts, and especially to Figs. 1 and 2, 1 represents the fire pot of a furnace 2, in the upper portion of which furnace there is provided a crucible 3 adapted to hold molten glass 4. A portion of this crucible is formed with a rocker or half round trunnion 5, by means of which the crucible may be tipped up into an inclined position such as that indicated by the dotted lines in Fig. 2. The cover 6 of the furnace extends over the crucible and is formed at the rear with a downwardly extending flange or lip 7 which projects toward the molten glass so as to increase the heating efficiency at the rear edge of the crucible which projects beyond the flange 7. Beyond this flange 7 the space 8 may be considered to constitute a drawing or working chamber in which the sheet of glass is drawn. In addition to this, the rear wall 9 of the furnace is provided with a sill 10 which projects forwardly over the rear edge of the crucible, as indicated, and this sill also operates to assist in retaining the heat at this point. This sill 10 is provided on its under side with a rocker or half round trunnion 11 which enables the sill to be tipped upwardly into the inclined position in which it is indicated in dotted lines in Fig. 2. Under the working chamber 8 the bottom of the crucible is provided with openings 12 formed in upwardly projecting nipples 13, as indicated in Fig. 3. At this side of the furnace I provide a main frame or gallows 14, which frame comprises uprights or posts 15 disposed opposite to each other, as shown. On these posts just above the sill 10 stub shafts 16 are rotatably mounted, and another shaft 17 is mounted between the upper ends of the standards. These shafts are provided with sprocket wheels 18 over which endless sprocket chains 19 pass, as shown. At suitable points these sprocket chains are provided with hooks 20, the purpose of which will be described more fully hereinafter. Just forward of the endless chains I provide a baiting frame 21. This baiting frame comprises a horizontal batten 22 which is supported at its ends upon cords 23. At its extremities side bars 24 extend vertically downward. Referring especially to Fig. 4, the lower ends of these side bars 24 are threaded to receive guide rods 25 which hang vertically downward from the side bars, as shown. Slidably mounted on these guide rods 25 I provide a bait 26, which consists of a horizontal bar near the ends of which openings 27 are provided through which the guide rods 25 pass. These openings 27 are sufficiently large to enable the bait to be drawn up onto the low ends of the side bars 24 and into the position such as that indicated in dotted lines in Fig. 4. In order to enable the bait to be drawn up in this way, it is supported by means of cords 28 which are attached to pulleys 29, as indicated, the said pulleys being rigidly mounted on an axle 30 rotatably carried in brackets 31 attached to the under side of the batten 22.

The fire pot 1 is formed with inside heating chambers 32 which communicate with the interior of the fire pot and heat the side walls of the crucible, as will be understood from an inspection of Fig. 1. In the lower portion of the fire pot a burner 33 is provided, and a similar burner 34 is applied to the furnace through the rear wall 9 thereof, as indicated in Fig. 2. In addition to this, a pair of draw burners 35 are provided, which extend across the sill 10, so that the flame from them may be directed upon the drawn sheet, in a manner which will be described more fully hereinafter.

Between the chains 19 and the lip 7 I provide a shield or screen 36, which is suspended in a vertical position and tends to protect the drawn sheet, as will appear more fully hereinafter. In connection with the apparatus, I employ a clamp 37, the construction of which is clearly illustrated in Fig. 5. This clamp consists of a pair of oppositely disposed parallel bars 38, the ends of which are connected by studs 39 pivotally attached at 40, to one of the bars and passing through the opposite bar. These studs have threaded extremities to receive wing nuts 41 and 41ª, and these wing nuts screw up against springs 42 disposed around the studs and thrusting against the uppermost of the bars, so that when the wing nuts are screwed up, the bars will be clamped together. The wing nut 41ª has the form of a handle, and the end of the upper bar at this end of the clamp is formed with an open slot 43 which enables the connection between the bars at this point to be readily thrown out so as to enable the bars to be separated at this end.

The manner in which the process is carried out, and the mode of operation of the apparatus will now be described: The crucible 3 is normally in an inclined position, so that the openings 12 are above the level of the molten glass. In order to enable the crucible to be tilted in this manner, the trunnion 5 is provided, as described above, and in order to enable the sill to be moved back out of the way of the adjacent edge of the crucible in swinging upwardly, the aforesaid trunnion 11 is provided on the sill. After the glass has been brought to the proper condition for drawing, the crucible and sill are returned to the position in which they are illustrated in Fig. 2. Previous to this, however, the drawing frame 21 is lowered so as to project the lower ends of the side bars 24 into the openings 12. In this way the openings 12 are closed to prevent escape of the molten glass when the crucible is returned to its horizontal position. The guide rods 25 are then passed upwardly through the openings 12 and screwed into the lower ends of the side bars. This operation being completed, the drawing operation then begins. In order to draw the sheet, the baiting frame is then drawn upwardly so that the bait and guide rods move upwardly in unison. As the bait leaves the surface of the molten glass, a sheet 44 of glass adheres to the lower edge thereof, and as the bait moves upwardly, the glass is drawn from the crucible in the form of a sheet. In this way the guide rods are drawn upwardly through the openings 12 in the bottom of the crucible, and constantly present themselves adjacent to the edges of the forming sheet. The edges of the drawn sheet adhere to these guide rods, so that the drawn sheet is formed, as it were, in a frame, the upper bar of which is the bait and the side bars of which are the guide rods. In this way the sheet of glass is maintained of uniform width and thickness, and there is no tendency of the side edges to recede toward the central vertical axis of the sheet, which is the primary difficulty overcome by this invention. As the drawing progresses, the drawn sheet near the surface of the molten glass and near the guide rods, is maintained at a high temperature by means of the burners 35. These burners insure that the glass will be kept in a sufficiently ductile condition at its side edges to maintain its adhesion with the guide rods. It is found in practice that in drawing the glass in this manner, it frequently happens that the upper portion of the sheet of glass will crack in a horizontal direction so as to form a gap 45 separating the bait from the body of the sheet, as illustrated in Fig. 1. In order to hold the sheet 44 of glass up in case this occurs, I provide the clamp 37 constructed as illustrated and described above. This clamp is applied in the manner shown in Fig. 1, the bars of the clamp being disposed on opposite sides of the sheet so as to clamp the same. The ends of the clamp project beyond the side edges of the sheet and are adapted to be engaged by the hooks 20 carried by the chains 19. The chains are then advanced manually or in any other suitable manner, so that the bait 26 is relieved of the weight of the body of the glass therebelow. The screen 36 protects the drawn sheet from the furnace heat and prevents the sheet from becoming so hot as to interfere with the drawing process.

Having thus described my invention, I claim as new and desire to secure by Letters Patent:

1. The process of forming sheet glass, which consists in drawing the sheet from a molten mass of glass, supporting the sides of said sheet against recession by adhesion of the extreme edges of said sheet to guide rods, and heating said sheet adjacent to said edges while allowing the body thereof to cool.

2. In glass making apparatus, in combination, a crucible having openings in the bottom thereof, a frame having depending side bars adapted to plug said openings when lowered, rods secured in the lower ends of said bars and adapted to be drawn up through said openings when said frame is raised, and a bait between said rods.

3. In glass making apparatus, in combination, a crucible having openings in the bottom thereof, a drawing frame having depending bars adapted to plug said openings when said frame is lowered, rods secured in the lower ends of said bars and passing up through said openings, and a bait suspended in said frame and having its ends guided on said bars.

4. In glass drawing apparatus the combination with a clamp comprising sheet clamping parts extending across the sheet, of means for securing the parts together, said parts projecting beyond the edges of the sheet, and carrying means engaging the projecting parts for moving the clamp when the parts are secured together.

In testimony whereof I have signed my name to this specification in the presence of two subscribing witnesses.

ENGLEBERT LUDVIK HEINTZ.

Witnesses:
   JOSEPH H. GOOD,
   OSCAR F. HEINTZ.